United States Patent [19]
Koike et al.

[11] 3,922,020
[45] Nov. 25, 1975

[54] FLUID PRESSURE CONTROLLING DEVICE FOR BRAKE SYSTEM OF WHEELED VEHICLE

[75] Inventors: Yoshitaka Koike; Keiichiro Yabuta, both of Yokohama, Japan

[73] Assignee: Nissan Motor Company Limited, Yokohama City, Japan

[22] Filed: Jan. 31, 1975

[21] Appl. No.: 545,916

[52] U.S. Cl. .............................. 303/6 C; 303/24 C
[51] Int. Cl.² ......................................... B60T 13/06
[58] Field of Search ........ 303/6 C, 6 R, 24 A, 24 C, 303/24 F, 24 R

[56] References Cited
UNITED STATES PATENTS

| | | | |
|---|---|---|---|
| 3,252,740 | 5/1966 | Stelzer | 303/24 F X |
| 3,663,067 | 5/1972 | Yabuta | 303/6 C |
| 3,771,835 | 11/1973 | Yabuta | 303/6 C |
| 3,825,303 | 7/1974 | Yabuta | 303/6 C X |

Primary Examiner—Duane A. Reger

[57] ABSTRACT

The device has a differential plunger axially movable in a stepped bore formed in a housing for modulating a first fluid pressure supplied thereto when the pressure exceeds a critical magnitude, wherein one end face of the plunger is exposed exclusively to a second fluid pressure of which modulation is unintended, and the other end face is isolated from the first and second fluid pressures but receives such a compression force from a spring installed thereon between a piston that the critical magnitude is raised if the second fluid pressure is not supplied to the former end of the plunger. The piston is exposed to the first or second fluid pressure through a normally open valve, and a movable member is disposed in the housing, which member moves and closes the valve when the device is subjected to a deceleration larger than a predetermined magnitude, so that the critical magnitude of the first fluid pressure is raised as the weight of the vehicle increases.

7 Claims, 9 Drawing Figures

FLUID PRESSURE CONTROLLING DEVICE FOR BRAKE SYSTEM OF WHEELED VEHICLE

This invention relates to a fluid pressure controlling device for a hydraulic brake system of the split fluid pressure system type for a wheeled vehicle.

In a brake system for a wheeled vehicle wherein both the front and rear wheels of the vehicle are braked at the same time, the braking force is preferably proportioned such that the front and rear wheels are locked simultaneously. If the front wheels are locked earlier, it becomes impossible to steer the vehicle, while the vehicle tail begins to slip sidewise or skid when locking of the rear wheels precedes. Either of such unbalanced modes of locking is unfavorable for attaining the braking with good stability and at high efficiency.

As is known, braking forces on the front and rear wheels must be correlated nonlinearly with each other in order to lock the front and rear wheels simultaneously, and an ideal relationship between the front and rear braking forces varies as the laden or gross weight of the vehicle varies. In order to realize a nonlinear relationship between the front and rear braking forces, it has been hitherto proposed to employ either a limiting valve, which modulates an input fluid pressure thereto but ceases the modulation when the input pressure exceeds a critical pressure, or a proportioning valve, which modulates the input fluid pressure at two different rates depending on the input pressure ranges. Such a technique, however, is not fully satisfactory since the critical pressure at which the modulation rate varies is predetermined independently of the vehicle weight. Accordingly, it has been proposed to vary the critical pressure in proportion to the vehicle weight by means of an inertia-responsive valve which incorporates a deceleration sensor. This valve is not yet ideal since the magnitude of the critical pressure per unit vehicle weight is kept constant and hence the relationship between the front and rear braking forces is deviated from a theoretical curve depending on the vehicle gross weight.

To overcome the shortcomings of these valves, an improved valve has been proposed, which valve has a means to estimate a weight laden on the vehicle by sensing the variation in the distance between, e.g., the vehicle axle and the body. This valve is constructed such that the critical fluid pressure for the function thereof increases as the laden weight increases at a rate higher than the direct proportion. Although the output characteristic of this valve is comparatively favorable, this valve involves disadvantages that the construction thereof is extremely complicated, that troublesome works are required for the installation thereof on the vehicle and that some mechanical elements thereof are liable to cause troubles since they are necessarily left uncovered.

Apart from the proportioning of the braking forces on the front and rear wheels, current motor vehicles are obliged to employ a brake system which has at least two independent fluid circuits so that the braking of the vehicle may be attained even if a local failure occurs in the system. It is a usual practice to prepare two independent fluid circuits for the front and rear wheels, respectively.

When one of the fluid circuits in this type of brake system is equipped with any of the aforementioned control valves and the other circuit becomes inoperative, there occurs a noticeable reduction in the braking efficiency since the output pressure of the former circuit remains at a lower level than the input pressure despite the failure in the latter circuit.

It is therefore an object of the present invention to provide an improved fluid pressure controlling device for a split type of hydraulic brake system for a wheeled vehicle, which valve develops a modulated output fluid pressure at a variable rate depending on the magnitude of an input pressure and the gross weight of the vehicle, but substantially ceases to modulate the input fluid pressure when a failure occurs in one of the fluid circuits which is not under the control of the device.

According to the invention, a fluid pressure controlling device comprises: a housing having therein a stepped bore; a differential plunger axially movably received in the bore; a first inlet port for supplying a first fluid pressure to a first end of the plunger; a second inlet port, which is fluidly separate from the first inlet port, for supplying a second fluid pressure to a middle portion of the plunger; an outlet port communicable with the second inlet port through the bore; a piston axially movably received in the bore opposite to a second end face of the plunger, the piston and the second end face being fluidly isolated from the first and second inlet ports; a first compression spring installed between the second end face and the piston to exert a force on the second end face; a third inlet port for supplying one of the first and second fluid pressure to an end face of the piston remoter from the plunger; a deceleration-responsive member movably received in the bore between the piston and the third inlet port; means to regulate the magnitude of a load on the compression spring resulting from the fluid pressure acting on the piston; and a valve means to break the fluid communication between the third inlet port and the piston when the deceleration-responsive member is seated thereon. The bore and the plunger are shaped such, and the second inlet port and the outlet port are arranged such that the second fluid pressure applied to the second inlet port is transmitted to the outlet port without modulation when the magnitude thereof is below a critical value but modulated to a third fluid pressure when the magnitude thereof exceeds the critical value. The rate of increase in the third fluid pressure is kept lower than, inclusive of zero, the rate of increase in the second fluid pressure. The areas of the first and second end faces of the plunger are correlated with each other such that the critical value is raised when the first fluid pressure is not substantially supplied to the first inlet port. The deceleration-responsive member is seated on the valve means when the device is subjected to a deceleration larger than a predetermined magnitude to prevent the load from increasing as the fluid pressure supplied to the third inlet port increases thereafter, wherein the load is regulated such that the critical value is raised as the gross weight of the vehicle increases.

The deceleration-responsive member is preferably a ball member rollably received in an axially grooved chamber formed in the bore adjoining the third inlet port, which ball member remains separate from the valve means when the longitudinal axis of the chamber is kept at an angle between a horizontal plane, but is seated on the valve means when the device is subjected to the above described deceleration. The means to regulate the magnitude of the load on the first compression spring is preferably a second compression spring installed between the piston and a partition formed in the bore to fluidly isolate the second end face of the plunger from the second inlet port, wherein the spring constants and stationary loads of the two compression springs are respectively predetermined to attain the above described relationship between the critical value of the second fluid pressure and the gross weight of the vehicle.

A device according to the invention generally has the following advantages. Firstly, a critical input pressure, at which the device begins to produce a modulated output pressure different from the input fluid pressure, is increased at a progressively increasing rate as the gross weight of the vehicle increases so that the modulated output pressure is maintained in close approximation with theoretically desirable values. Secondly, both the critical pressure and the output pressure increase remarkably when a failure occurs in a fluid circuit which is not under the control of the device, so that the output pressure in such a case is maintained substantially unchanged from the input pressure. Besides, the device is comparatively simple in construction and needs no additional element.

The nature and features of the invention will become more clear from the following detailed description with reference to the accompanying drawings, in which.

In a wheeled vehicle such as a motor vehicle having a gross weight W, which gives a front axle load $W_f$ and a rear axle load $W_r$, the front and rear braking forces $B_f$ and $B_r$ must satisfy the following mathematical conditions, respectively, in order that the front and rear wheels are locked simultaneously.

$$B_f \geqq \mu \left( W_f + \frac{W}{g} \cdot \alpha \cdot \frac{H}{L} \right)$$

$$B_r \geqq \mu \left( W_r - \frac{W}{g} \cdot \alpha \cdot \frac{H}{L} \right)$$

where $\mu$ is a coefficient of friction between the wheel and a road surface, $g$ is the gravitational acceleration, $\alpha$ is the deceleration of the vehicle speed, H is the distance between the center of gravity of the vehicle and the road surface and L is the distance between the front and rear axles. When the front and rear wheels are locked simultaneously, it holds that $\alpha/g = \mu$.

Therefore, the front and rear wheels can be locked simultaneously when the front and rear braking forces $B_f$ and $B_r$ are proportioned as follows.

$$\frac{B_f}{W} = \mu \left( \frac{W_f}{W} + \frac{\mu H}{L} \right)$$

$$\frac{B_r}{W} = \mu \left( \frac{W_r}{W} - \frac{\mu H}{L} \right)$$

Figure 1:
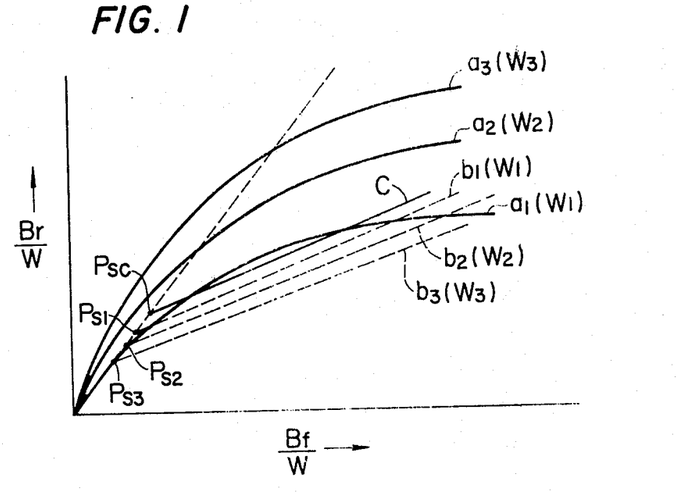
FIG. 1 is a graph showing qualitatively general tendencies of desirable and hitherto realized relationships between the front and rear braking forces for a wheeled vehicle with various gross weights.

Referring to FIG. 1, curves $a_1$, $a_2$ and $a_3$ represent ideal relationships between the ratios $(B_f/W)$ and $(B_r/W)$ for braking the vehicle to result in a simultaneous locking of the front and rear wheels. The ideal curve varies from $a_1$ to $a_2$ and further to $a_3$ as the vehicle weight increases from $W_1$ to $W_2$ and $W_3$.

If a front brake cylinder is always applied with a fluid pressure developed by a master cylinder, a rear brake cylinder is preferably applied with a differently controlled fluid pressure so as to achieve non-linear relationships between the ratios $B_f/W$ and $B_r/W$ as shown by the curves $a_1$, $a_2$ and $a_3$. These curves show that the rate of increase in the rear braking force $B_r$ or the fluid pressure for the rear brake cylinder should be decreased as the front braking force $B_f$ or the fluid pressure for the front increase.

The broken lines $b_1$, $b_2$ and $b_3$ represent variations in $B_r/W$ for the vehicle weights $W_1$, $W_2$ and $W_3$, respectively, when the fluid pressure to the rear brake cylinder is controlled by a prior art proportioning valve. The proportioning valve maintains the rate of increase in the output pressure thereof constant and below one when the input fluid pressure thereto exceeds a predetermined critical pressure Ps. Since the critical pressure Ps is determined irrespective of the actual vehicle gross weight, the ratio $B_r/W$ at the predetermined critical pressure Ps decreases from $Ps_1$ to $Ps_2$ or $Ps_3$ as the weight increases from $W_1$ to $W_2$ or $W_3$ and results in extreme deviation of the actual $B_r/W$ values from the desirable values on the curves $a_2$ or $a_3$.

Even if the aforementioned inertia-responsive valve is used in place of this proportioning valve to raise the critical pressure Ps as the vehicle weight W increases, the ratio $B_r/W$ at the varied Ps remains at a fixed point Psc on the coordinate system of FIG. 1 and the rear braking force is controlled linearly as represented by the solid line C. Consequently, there occurs still a noticeable deviation of actual $B_r/W$ values from the ideal values when the weight W is relatively heavy.

The present invention aims at the realization of a more close approximation of the actual relationship between the ratios $B_r/W$ and $B_f/W$ to the ideal curves such as $a_1$, $a_2$ and $a_3$.

Figure 2:
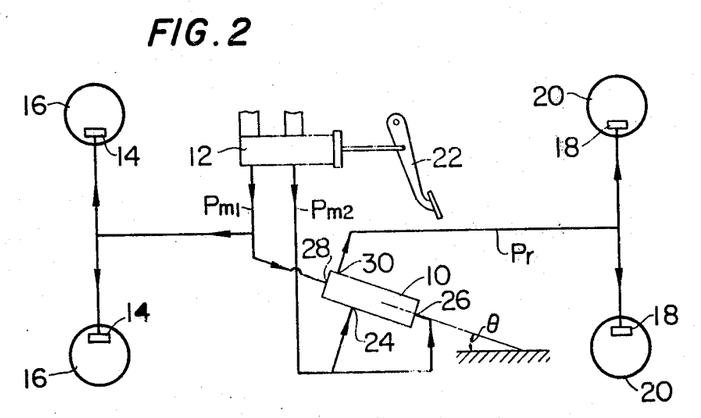
FIG. 2 is a diagram of a hydraulic brake system for a wheeled vehicle, in which a fluid pressure controlling device of the invention is employed.

Referring now to FIG. 2, a fluid pressure controlling device 10 according to the invention is employed in a usual brake system of a four-wheel vehicle. A brake master cylinder 12 of this system develops two independent braking fluid pressures, i.e., $Pm_1$ for front brake cylinders 14 on front wheels 16 and $Pm_2$ for rear brake cylinders 18 on rear wheels 20, when actuated by a brake pedal 22. The controlling device 10 is arranged such that the longitudinal axis thereof forms an angle $\theta$ from a horizontal plane. The fluid communication between the master cylinder 12 and the rear brake cylinders 18 is provided through the controlling device 10. A first inlet port 24 and a second inlet port 26 of the device 10 are connected with the master cylinder 12 such that the fluid pressure $Pm_2$ for the rear cylinders 18 is applied thereto while a third inlet port 28 is also connected to the master cylinder 12 such that the fluid pressure $Pm_1$ is applied thereto simultaneously with the front cylinders 14. An outlet port 30 of the device 10 is connected with the rear cylinders 18.

Figure 3:
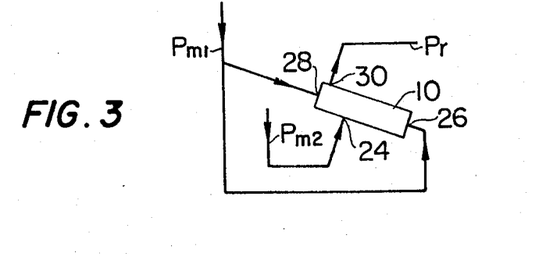
FIG. 3 is a fragmentary diagram of the same system showing a slightly modified mode of fluid pressure supply to the controlling device.
Figure 4:
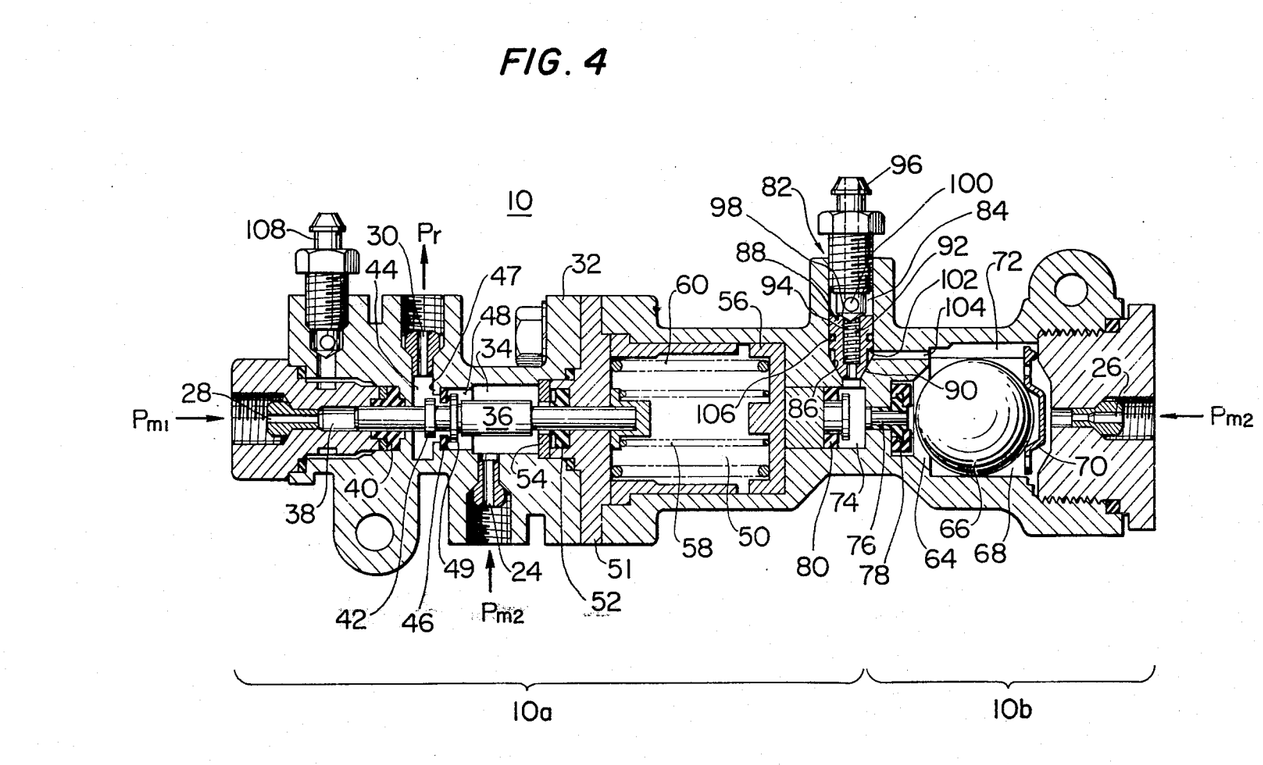
FIG. 4 is a longitudinal sectional view of a fluid pressure controlling device of the invention.

An embodiment of the fluid pressure controlling device 10 according to the invention is illustrated in FIG. 4. The device 10 is functionally divided into two portions, a pressure proportioning portion or a control valve 10a on the left side in FIG. 4 and a deceleration-responsive portion or a govornor 10b on the right side, but constructed in an integrated body or housing 32. In the proportioning portion 10a, the third inlet port 28 is formed at the left side end of the housing 32, and a generally cylindrical and stepped bore 34 is formed therefrom along the longitudinal axis of the housing 32, receiving slidably therein a differential plunger 36. A first chamber 38 in the stepped bore 34 adjoining the third inlet port 28 is fluidly isolated from the remaining portion of the bore 34 by means of a seal 40 surrounding the plunger 36. A left side end portion of the plunger 36 is received in this chamber 38 and has a diameter $D_1$ and a cross sectional area $A_1$. The plunger 36 has a first flange 42 located in a second chamber 44 of the bore 34, which chamber 44 is adjacent to the seal 40 and in direct communication with the outlet port 30 of the device 10. The flange 42 has a diameter $D_2$ and a cross sectional area $A_2$. The bore 34 is provided with an annular lip seal 46 at a location between the second chamber 44 and a third chamber 48 adjacent thereto on the right side in FIG. 3. The plunger 36 has a second flange 49 which is located in the third chamber 48 at a distance from the first flange 42. The lip seal 46 is positioned between the first flange 42 and the second flange 48. The left side of the lip seal 46 is seated on a shoulder 47 which borders the second and third chambers 44 and 48 and engageable with the right side end of the first flange 42. The right side of the lip seal 46 is locally projected so as to come into contact with the left side end of the second flange 49. The third chamber 48 is exposed to the first inlet port 24. The right side end of the bore 34 forms a cylindrical fourth chamber 50, which is fluidly isolated from the third chamber 48 by a partition 51. The right side end portion of the plunger 36 passes through the partition 51 slidably and hermetically by means of an annular seal 52 installed on the partition 51 by the support of an annular retainer 54. This end portion of the plunger 36 has a diameter $D_3$ and a cross sectional area $A_3$ and protrudes into the fourth chamber 50. The cross-sectional areas $A_1$, $A_2$ and $A_3$ are different from each other bearing a relationship, $A_2 > A_3 > A_1$.

An axially reciprocating piston 56, which has a diameter $D_4$ and a cross sectional area $A_4$, is received in the fourth chamber 50, and a first compression spring 58 is installed in the fourth chamber 50 to exert a spring force $F_1$ thereof on both the right side end of the plunger 36 and the left side end of the piston 56. A second compression spring 60 having a spring force $F_2$ is seated on the partition 51 which serves as the left side bottom of the fourth chamber 50 and exerts the force $F_2$ thereof on the left side end of the piston 56.

In the deceleration-responsive portion or governor 10b, the second inlet port 26 of the device 10 is formed at the right side end of the housing 32 in FIG. 4. A stepped second bore 64 formed along the longitudinal axis of the housing 32 provides the communication between the second inlet port 26 and the right side end of the piston 56. A ball member 66 is rollably received in a fifth chamber 68, which is formed in the bore 64 adjoining the second inlet port 26 and spaced from the inlet port 26 by means of a ball support member 70 with holes therein. The peripheral wall of the fifth chamber 68 is provided with at least one axial groove 72 to allow the second inlet port 26 to communicate with the left side portion of the bore 64. The left side end portion of the bore 64 forms a sixth chamber 74, to which the right side end of the piston 56 is exposed, and the remaining portion of the bore 64 between the fifth and sixth chambers 68 and 74 forms a relatively narrow passageway 76. A flanged annular seal member 78 is seated on the left side bottom of the fifth chamber 68. The sixth chamber 74 is fluidly isolated from the fourth chamber 50 by means of an annular seal 80 engaging with the piston 56.

The deceleration-responsive portion 10b is equipped with an air-bleeding valve 82 of preferably the following construction. A generally cylindrical bore 84 is formed through the housing 32 to allow the sixth chamber 74 to communicate with the atmosphere. An interior end portion of the bore 84 is shaped conical so as to serve as a valve seat 86, and a plug 88 which is generally cylindrical but has a conical end portion 90, is slidably received in the bore 84 such that the conical portion 90 is normally seated on the valve seat 86. The plug 88 has therein a stepped axial bore 92 and receives a third spring 94 therein. A bleeding member 96 is thread-engaged with the wall of the bore 84 such that a conical end portion 98 of the former is seated on the exterior end of the bore 92 of the plug 88. Thus, the bore 92 is kept sealed, and the spring 94 is caused to push the plug 88 onto the valve seat 86. The upper portion of the bore 84 above the plug 88 communicates with the atmosphere through a hole 100 in the plug 88, and the lower portion of the bore 84 below a shoulder 102 of the plug 88 communicates with the fifth chamber 68 through a passageway 104 formed in the housing 32. The upper and lower portions of the bore 84 is isolated from each other by means of an O-ring 106 surrounding the plug 88. The proportioning portion 10a of the device 10 is equipped with an air-bleeding valve 108 of the usual construction for the usual purpose.

The operation of the thus constructed fluid pressure controlling device 10 is as follows. The master cylinder 12 in the brake system of FIG. 2 develops fluid pressures $Pm_1$ and $Pm_2$ for the front and rear brake cylinders 14 and 18, respectively. The fluid pressures $Pm_1$ and $Pm_2$ are independent from each other but substantially equal in the magnitude thereof. The fluid pressure $Pm_1$ is supplied to the front cylinders 14 and at the same time to the third inlet port 28 of the control device 10. The other fluid pressure $Pm_2$ is supplied exclusively to the first and second inlet ports 24 and 26 of the controlling device 10. Thus the fluid pressure $Pm_1$ acts on the left side end face of the plunger 36, while the fluid pressure $Pm_2$ flows into the second chamber 44 through the gap between the plunger 36 and the lip seal 46 and then to the rear brake cylinders 18 from the outlet port 30 of the device 10. Accordingly an output fluid pressure $Pr$ from the device 10 in this instant is unvaried from the input pressure $Pm_2$. However, the pressure $Pm_1$ acting on the area $A_1$ of the left side end of the plunger 36 causes the plunger 36 to move rightward in FIG. 4 when the force $Pm_1 \cdot A_1$ is greater than the force $F_1$ of the first spring 58, until the first flange 42 is forced to come into contact with the annular lip seal 46 and breaks the communication between the first inlet port 24 and the outlet port 30.

A minimum magnitude of the fluid pressure $Pm_1$ to accomplish such a displacement of the plunger 36 will be represented by a critical pressure $Ps$. Since the distance of this displacement is quite short and hence the resulting increase in the force $F_1$ of the first spring 58 is practically negligible, the critical pressure $Ps$ can be determined by the equation $$Ps \cdot A_1 = F_1$$

therefore;

$$Ps = F_1/A_1 \qquad (1)$$

The output fluid pressure $Pr$ is equal to the input pressure $Pm_1$ or $Pm_2$, which hereinafter will be represented simply by $Pm$ when $Pm \leq Ps$ or before the above mentioned displacement of the plunger 36, $$Pr = Pm \qquad (2)$$

When the input fluid pressure $Pm$ continues to increase after the first flange 42 and the lip seal 52 isolate the second chamber 44 from the third chamber 46, the fluid pressure $Pm$ acts on the right side face of the first flange 42 and causes the plunger 36 to move leftward. Consequently, the output fluid pressure $Pr$ in the second chamber 44 begins to increase. In this state where $Pm \geq Ps$, the plunger 36 is held in a balanced position and the output or modulated fluid pressure $Pr$ has the following relationship between the input fluid pressure $Pm$.

$$Pm \cdot A_1 + Pr(A_2 - A_1) = Pm(A_2 - A_3) + F_1 \qquad (3)$$

therefore, $$Pr = \frac{A_2 - A_3 - A_1}{A_2 - A_1} Pm + \frac{F_1}{A_2 - A_1} \qquad (4)$$

The effective area ratio $$\frac{A_2 - A_3 - A_1}{A_2 - A_1}$$

is a constant smaller than 1 and hereinafter will be represented by $k$.

Figure 5:
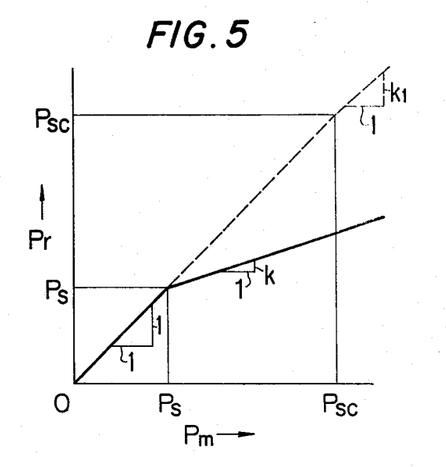
FIG. 5 is a graph showing qualitatively the relationship between an input pressure and output pressure with respect to the device of FIG. 4.

In the graph of FIG. 5, the solid line represents the above described relationship between the input pressure $Pm$ and the output pressure $Pr$. The output pressure $Pr$ increases from zero as the input pressure $Pm$ increases from zero at the same rate as the latter $Pm$ when $Pm < Ps$. When $Pm$ exceeds $Ps$, the rate of increase in the magnitude of $Pr$ lowers to $k$ times the rate of increase in the magnitude of $Pm$.

Meanwhile, the magnitude of the total braking force $B = B_f + B_r$ increases as the input pressure $Pm$ increases in proportion to the latter as $B = C \cdot Pm$ where $C$ is a constant, resulting in increase in the magnitude of the deceleration of the vehicle speed $\alpha$, which is calculated by dividing the braking force $B$ by the vehicle gross weight $W$. More strictly, the thus calculated quotient is equal to the quotient of $\alpha$ by the gravitational acceleration $g$ $$\alpha/g = B/W \qquad (5)$$

When the deceleration $\alpha$ or the quotient $\alpha/g$ reaches a predetermined value $R$, which is dependent on the angle $\theta$ in FIG. 2 and may be represented by a function $R = f(\theta)$, the ball member 66 in the deceleration-responsive portion 10b is rolled leftward in FIG. 4 against the inclination $\theta$ and seated on the seal 78. Consequently, the passageway 76 is isolated from the fifth chamber 68, and the magnitude of the fluid pressure acting on the piston 56, which is equal to $Pm$ when the sixth chamber 74 is allowed to communicate with the fifth chamber 68 through the passageway 76, is maintained at a constant pressure $Pg$ attained at the instant of the closure of the passageway 76. This value $Pg$ can be given by $$Pg = \frac{f(\theta)}{C} W \qquad (6)$$

In this state, there holds the following relationship between the forces $F_1$ and $F_2$ of the first and second springs 58 and 60 and the external force acting on the exterior end of the piston 56.

$$F_1 + F_2 = Pg \cdot A_4 = \frac{f(\theta)}{W} A_4 \qquad (7)$$

The force $F_1$ of the first spring 58 is the sum of a stationary load $f_1$ on the spring 58 when the input pressure $Pm$ is zero and the product of the spring constant $K_1$ by the magnitude of the deflection caused by the external force on the piston 56, and also the force $F_2$ of the second spring 60 is similarly analyzed putting the stationary load and the spring constant as $f_2$ and $K_2$, respectively. Then the relationship between $F_2$ and $F_1$ is expressed by the equation $$F_2 = f_2 + \frac{K_2}{K_1}(F_1 - f_1) \qquad (8)$$

From the equations (7) and (8), $$F_1 = \frac{\frac{f(\theta)}{C} A_4 \cdot W - \left(f_2 - \frac{K_2}{K_1} f_1\right)}{1 + \frac{K_2}{K_1}} \qquad (9)$$

When $Pm < Ps$, therefore, the critical pressure $Ps$ according to the equation (1) is given by $$Ps = \frac{\frac{f(\theta)}{C} A_4 \cdot W - \left(f_2 - \frac{K_2}{K_1} F_1\right)}{A_3 \left(1 + \frac{K_2}{K_1}\right)} \qquad (10)$$

and the output pressure $Pr$ when $Pm \geq Ps$ according to the equation (3) is given by $$Pr = k \cdot Pm + \frac{F_1}{A_2 - A_1}$$

$$= K \cdot Pm + \frac{\frac{f(\theta)}{C} A_4 \cdot W - \left(f_2 - \frac{K_2}{K_1} f_1\right)}{(A_2 - A_1)\left(1 + \frac{K_2}{K_1}\right)} \quad (11)$$

Figure 6:
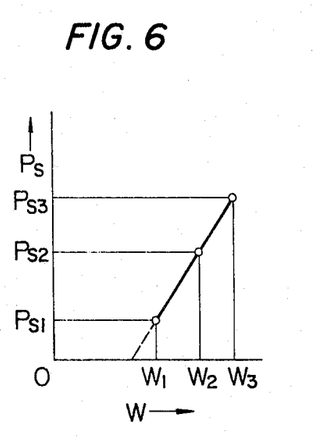
FIG. 6 is a graph showing qualitatively the relationship between the vehicle gross weight and the critical input pressure for the device of FIG. 4.

As seen from the equation (10), the critical pressure $Ps$ can be varied with respect to the vehicle gross weight $W$ in such a manner that $Ps$ increases at a progressively increasing rate as $W$ increases if the stationary loads $f_1, f_2$ and the spring constants $K_1, K_2$ are determined so as to make the value $$\left(f_2 - \frac{K_2}{K_1} f_1\right)$$

greater than zero. The graph of FIG. 6 illustrates such a relationship between $W$ and $Ps$ attained by the device 10.

It will be understood from the above description that either of the two fluid pressures $Pm_1$ and $Pm_2$ can be used for exerting an external force on the piston 56. Accordingly, the fluid pressure $Pm_1$ may be supplied both to the second and third inlet ports 26 and 28 while the fluid pressure $Pm_2$ is supplied exclusively to the first inlet port 24 as shown in FIG. 3.

If there occurs a failure in developing the fluid pressure $Pm_1$ for the front brake cylinders 14 in FIG. 2, the equations (3) and (4) are rewritten as follows, respectively.

$$Pr(A_2 - A_1) = Pm_2(A_2 - A_3) + F_1 \quad (12)$$

$$Pr = \frac{A_2 - A_3}{A_2 - A_1} Pm_2 + \frac{F_1}{A_2 - A_1} \quad (13)$$

wherein $$\frac{A_2 - A_3}{A_2 - A_1}$$

is denoted as $k_1$, which is larger than $k$. The braking force $B$ under this condition is expressed by $B = C_1 \cdot Pm_2$ wherein $C_1$ is smaller than $C$, and a critical pressure $Psc$ under this condition is given by a modification of the equation (10), $$Psc = \frac{\frac{f(\theta)}{C} A_4 \cdot W - \left(f_2 - \frac{K_2}{K_1} f_1\right)}{(A_3 - A_1)\left(1 + \frac{K_2}{K_1}\right)} \quad (14)$$

Accordingly, the magnitude of $Psc$ is larger than that of $Ps$ in a normal state.

The relationship between the input pressure $Pm(Pm_2)$ and the output pressure $Pr$ when only $Pm_2$ is supplied to the control device 10 is shown in FIG. 5 by a broken line. Since the magnitude of the critical pressure $Psc$ is very large compared with $Ps$ values under a normal condition and the rate of increase $k_1$ is larger than $k$ and closer to one, the output pressure $Pr$ can be maintained substantially unchanged from the input pressure $Pm_2$ even when $Pm_2$ becomes the maximum value thereof.

As seen from the above description, the position of the proportioning plunger 36 is governed not only by the input pressure $Pm_2$ for the rear brake cylinders 18 but also by the spring-loaded piston 56 and the input pressure $Pm_1$ for the front brake cylinders 14, The provision of the deceleration-responsive portion 10b, which regulates the magnitude of the external force acting on the piston 56 depending on the sensed vehicle gross weight, allows the critical pressure $Ps$ or a minimum magnitude of the input pressure $Pm_2$ for causing the proportioning portion 10a to modulate the input fluid pressure $Pm_2$ at a progressively increasing rate as the vehicle gross weight $W$ increases. Consequently, the relationship between the ratios $B_r/W$ for the rear wheels 20 and $B_f/W$ for the front wheels 16 can be maintained very close to the ideal curves such as $a_1$, $a_2$ and $a_3$ in FIG. 1 whatever the vehicle gross weight $W$ may be.

In addition to such a favorable output characteristic at normal states, the controlling device 10 features functionally that both the critical pressure $Ps$ and the pressure modulation rate $k$ are raised greatly as described above in case a failure of the fluid pressure $Pm_1$ for the front brake cylinders 14 should occur. Accordingly, the controlling device 10 according to the invention is quite advantageous over conventional control valves in the security of the braking. Besides, the controlling device 10 per se can sense the deceleration of the vehicle speed and hence the gross weight of the vehicle, so that the device 10 is not required to be assembled with a deflectionable member of the vehicle. The device 10, therefore, can be installed with ease on any wheeled vehicle requiring the provision of no additional element and hence can be maintained with little trouble.

When air is introduced into the fifth and sixth chambers 68 and 74 of the deceleration-responsive portion 10b, bleeding of the air is accomplished by the following procedures. Initially a relatively large magnitude of the input pressure $Pm$ is supplied to the inlet port 26. Then the bleeding member 96 is gently unscrewed to a certain extent, and the plug 88 is caused to move slightly upward by the fluid pressure exerting on the conical portion 90 and the shoulder 102 thereof. Thus the conical portion 90 is detached from the valve seat 86 and the fifth chamber 68 is allowed to communicate with the sixth chamber 74 through the passageway 104 despite the closure at the seal 78. The air in the fifth and sixth chambers 68 and 74 is forced out through the bore 92 of the plug 88 and the hole 100 of the bleeding member 96 by further unscrewing the bleeding member 96 until the upper portion of the bore 84 above the plug 88 becomes in communication with the bore 92. After completion of the air-bleeding, the bleeding member 96 is again screwed into the bore 84 until the conical portion 90 of the plug 88 is tightly seated on the valve seat 86 and the sixth chamber 74 is isolated from the passageway 104.

It will be understood that the provision of the passageway 104 and the plug 88 which serves as a valve member has the advantage that only a single bleeding valve 82 is required for discharging air from the two chambers 68 and 74 which are isolated from each other.

Figure 7:
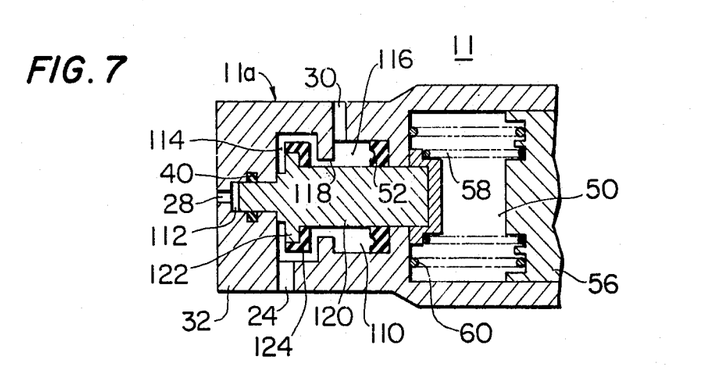
FIG. 7 is a fragmentary longitudinal sectional view of a device of the invention which is locally modified from the device of FIG. 4.

The proportioning portion 10a may be replaced by a limiting valve. In a fluid pressure controlling device 11 of FIG. 7 the deceleration-responsive portion 10b (not shown) is identical with that of the device 10 of FIG. 4. In a limiting valve portion 11a, the housing 32 has a stepped bore 110 along the longitudinal axis thereof. The bore 110 terminates on the left side in FIG. 7 at the third inlet port 28 and forms therein a first chamber 112 adjoining the inlet port 28, an enlarged second chamber 114 adjoining the first chamber 110 on the right side and a third chamber 116 on the right side of the second chamber 114 interposing a shoulder portion 118. A stepped cylindrical plunger 120 is disposed in the bore 110. The left side end portion of the plunger 120 is slidably received in the first chamber 112, which is fluidly isolated from the second chamber 114 by means of the seal 40. The plunger 120 has a flange 122, which is located in the second chamber 114 and covered with a valve sheet 124 on the right side face thereof. The third chamber 116 is fluidly isolated from the piston 56 in the fourth chamber 50 by means of the annular seal 52. The first inlet port 24 is formed at such a location that the input pressure $Pm_2$ is supplied to a left side portion of the second chamber 114 between the left side end thereof and the flange 122. The outlet port 30 adjoins the third chamber 116 and becomes isolated from the second chamber 114 when the valve sheet 124 of the plunger 120 is seated on the shoulder 118.

Figure 8:
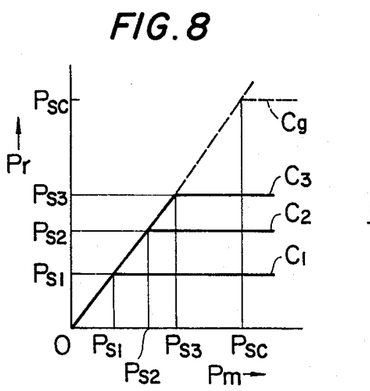
FIG. 8 is a graph showing qualitatively the relationship between an input pressure and an output pressure with respect to the device shown in FIG. 7.
Figure 9:
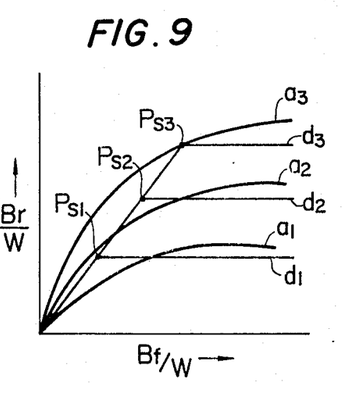
FIG. 9 is a graph showing qualitatively the relationship between the front and rear braking forces when a fluid pressure in the system of FIG. 2 is controlled by the device of FIG. 7 in comparison with the desirable curves in FIG. 1.

The above described construction of this limiting valve 11a is quite familiar and will need no explanation for the function thereof. Since the plunger 120 is governed by the springs 58, 60, piston 56 and the deceleration-responsive portion 10b similarly to the plunger 36 in FIG. 4, the relationship between the input pressure $Pm$ and the output pressure $Pr$ varies as represented by the lines $c_1$, $C_2$ and $c_3$ of the graph in FIG. 8 as the vehicle gross weight $W$ varies from $W_1$ to $W_2$ and $W_3$ causing the critical pressure $Ps$ to increase from $Ps_1$ to $Ps_2$ and $Ps_3$. Accordingly, the relationship between the ratios $B_r/W$ for the rear and $B_f/W$ for the front is represented by the lines $d_1$, $d_2$ and $d_3$ in FIG. 9, which are comparatively closer to the ideal curves $a_1$, $a_2$ and $a_3$, respectively, than in the case of a conventional limiting valve. When the input pressure $Pm_1$ supplied to the third inlet port 28 becomes zero, the critical pressure $Ps$ for the controlling device 11 exhibits a noticeable rise as shown by the broken line in FIG. 8.

What is claimed is:

1. A fluid pressure controlling device for a hydraulic brake system for a wheeled vehicle, the system being capable of developing independent and variable first and second fluid pressures for the front and rear brakes of the vehicle, the controlling device comprising: a housing having therein a stepped bore; a differential plunger axially movably received in said bore, a first inlet port for supplying said first fluid pressure to a first end face of said plunger; a second inlet port fluidly separate from said first inlet port for supplying said second fluid pressure to a middle portion of said plunger; an outlet port communicable with said second inlet port through said bore; a piston axially movably received in said bore opposite to a second end face of said plunger, said piston and said second end face being fluidly isolated from said first and second inlet ports; a first compression spring installed between said second end face and said piston to exert a force on said second end face; a third inlet port for supplying one of said first and second fluid pressures to an end face of said piston remoter from said plunger; a deceleration-responsive member movably received in said bore between said piston and said third inlet port; means to regulate the magnitude of a load on said compression spring resulting from said one fluid pressure acting on said piston; and a valve means to break the fluid communication between said third inlet port and said piston when said member is seated thereon; said bore and said plunger being shaped such, and said second inlet port and said outlet port being arranged such that said second fluid pressure at said second inlet port is transmitted to said outlet port without modulation when the magnitude thereof is below a critical value but modulated to a third fluid pressure when the magnitude thereof exceeds said critical value, the rate of increase in said third fluid pressure being lower than, inclusive of zero, the rate of increase in said second fluid pressure; the areas of said first and second end faces of said plunger being correlated with each other such that said critical value is raised when said first fluid pressure is not substantially supplied to said first inlet port; said member being seated on said valve means when the device is subjected to a deceleration larger than a predetermined magnitude to prevent said load from increasing as said one fluid pressure increases thereafter; said load being regulated such that said critical value is raised as the gross weight of the vehicle increases.

2. A device as claimed in claim 1, wherein said stepped bore forms therein first, second, third, fourth, fifth and sixth chambers substantially axially aligned with each other in the numerical order, said first chamber being fluidly separate from other chambers and communicating with said first inlet port, said first end face of said plunger being exposed to said first chamber, said second and third chambers being communicable with each other and providing fluid communication between said second inlet port and said outlet port, said plunger having a flange for controlling said fluid communication between said second inlet port and said outlet port, said second end face of said plunger extending into said fourth chamber hermetically through a partition formed between said third and fourth chambers; wherein said piston is received in said fourth chamber exposing said end face thereof remoter from said plunger to said fifth chamber, said means being a second compression spring installed in said fourth chamber between said partition and said piston; and wherein said member is a ball member rollably received in said sixth chamber, said ball member being separate from said valve means when the longitudinal axis of said sixth chamber is kept at an angle between a horizontal plane but being seated on said valve means when the device is subjected to said deceleration, said sixth chamber being axially grooved to provide fluid communication therethrough between said third inlet port and said fifth chamber until said ball member is seated on said valve means; said first and second compression springs having respectively predetermined spring constants and being installed with respectively predetermined stationary loads such that said critical value is raised as the gross weight of the vehicle increases.

3. A device as claimed in claim 2, further comprising an air-bleeding valve operably assembled with said housing, said air-bleeding valve being normally closed and capable of causing said fifth chamber to communicate with the atmosphere by the operation thereof, said housing being provided with a passageway arranged such that fluid communication is provided between said fifth and sixth chambers by-passing said seal member when said fifth chamber communicates with the atmosphere through said air-bleeding valve.

4. A device as claimed in claim 2, wherein the cross sectional area of said flange is larger than said area of said second end face of said plunger and the latter is larger than said area of said first end face.

5. A device as claimed in claim 2, wherein said first and second compression springs are installed with stationary loads of $f_1$ and $f_2$, respectively, said stationary load $f_2$ being larger than the product of $f_1$ by $K_2/K_1$, where $K_1$ and $K_2$ being the spring constants of said first and second springs, respectively.

6. A device as claimed in claim 2, wherein said flange is located in said second chamber, said bore being provided with an annular lip seal located between said flange and said third chamber, said second inlet port being exposed to said third chamber, said outlet port being exposed to said second chamber, so that said rate of increase in said modulated fluid pressure is higher than zero.

7. A device as claimed in claim 2, wherein said flange is located in said second chamber, said bore being provided with a shoulder capable of breaking fluid communication between said second and third chambers when said flange is seated thereon, said second inlet port being exposed to a face of said flange remoter from said shoulder, said outlet port being exposed to said third chamber, so that said rate of increase in said modulated fluid pressure is zero.

* * * * *